(12) United States Patent
Ching

(10) Patent No.: US 6,474,844 B1
(45) Date of Patent: Nov. 5, 2002

(54) STAND WITH WORK LIGHT THAT CAN BE DIRECTED AT MULTIPLE POSITIONS

(75) Inventor: Yueh Ching, Taipei (TW)

(73) Assignee: Test-Rite Products Corporation, Buena Park, CA (US)

( * ) Notice: Subject to any disclaimer, the term of this patent is extended or adjusted under 35 U.S.C. 154(b) by 0 days.

(21) Appl. No.: 09/752,442

(22) Filed: Apr. 10, 2001

(51) Int. Cl.[7] ............................................... F21V 21/29
(52) U.S. Cl. ....................... 362/285; 362/250; 362/238; 362/239; 362/419; 362/427
(58) Field of Search ................... 362/285, 250, 362/238, 239, 413, 419, 427

(56) References Cited

U.S. PATENT DOCUMENTS

| | | | | |
|---|---|---|---|---|
| 4,167,783 A | * | 9/1979 | Mitchell | 362/236 |
| 4,228,489 A | * | 10/1980 | Martin | 362/250 |
| 5,481,441 A | * | 1/1996 | Stevens | 362/35 |
| 5,695,279 A | * | 12/1997 | Sonnleitner et al. | 362/419 |
| 5,964,524 A | * | 10/1999 | Qian | 362/414 |

* cited by examiner

Primary Examiner—Sandra O'Shea
Assistant Examiner—Ronald E. DelgizziG
(74) Attorney, Agent, or Firm—Bacon & Thomas, PLLC

(57) ABSTRACT

A work light stand. The stand includes a stand having a cross bar and at least one work light. The work light is installed on the cross bar of the stand by a universal direction adapter positioned at a fixed angle of elevation, and which can be oriented towards any direction such that adjusting the light emitting direction can be achieved by adjusting the work light itself directly.

2 Claims, 3 Drawing Sheets

STAND WITH WORK LIGHT THAT CAN BE DIRECTED AT MULTIPLE POSITIONS

BACKGROUND OF THE INVENTION

1. Field of the Invention

This present invention relates to a work light stand; especially to a work light stand capable of adjusting the light emitting direction of the work light.

2. Description of the Prior Art

Work lights are used extensively in many night work settings. For convenience, the conventional work light is generally installed on a stand. Shown in FIG. 1 is a work light stand 10 that comprises a stand 11, a cross bar 12 and a work light 14; a U-shape adjuster 1, hinged to the cross bar 12 of the stand 11, can adjust the direction of light emitted from the work light 14 mounted on the cross bar 12. The two arms of the U-shape adjuster 1 are fastened to the two protruding edges at the bottom of the work light 14. A screw 4 fastens the U-shape adjuster 1 at the center of its bottom side to the cross bar 12.

However, under the prior art, adjustment of the light emitting direction requires at least two steps: first, the screw 4 fastening the U-shape adjuster 1 to the cross bar must be unwound so that the work light can be adjusted in the horizontal direction, after which the screw 4 is wound up to fasten the work light 14 in a fixed horizontal direction. Secondly, the screws 2 and 3 fastening between the U-shape adjuster 1 and the work light 14 are unwound so that the work light 14's angle of elevation can be adjusted, after which the screws 2 and 3 are again wound up to secure the work light 14 in its elevation angle. As the above indicates, the conventional work light stand 10 involves redundant steps when adjusting the light emitting direction of the work light 14, causing inconvenience to a user. Furthermore, when adjusting the horizontal direction and the angle of elevation, the user must use one hand to hold the work light 14 in place while using the other hand to wind up the screws 2, 3, and 4, a process that is laborious and time-consuming. In light of the above, the present invention furnishes a work light stand that provides easy adjustment of its light emitting direction, which thus has industrial practicality and utility.

The primary object of the present invention is to furnish a work light stand, which does not require unwinding of its screws in order to adjust its work light's emitting direction, thus making the work light stand convenient to use.

Another object of the present invention is to furnish a work light stand, which allows the user to simultaneously adjust the work light's horizontal direction and the angle of elevation when adjusting its light emitting direction, making the operation timesaving.

A further object of the present invention is to furnish a work light stand, which includes a universal direction adapter to adjust the work light's emitting direction.

SUMMARY OF THE INVENTION

Under the prior art, adjusting the work light stand to change the work light's emitting direction is laborious and time-consuming, and the repetitive process is inconvenient to the user. In light of such drawbacks in the prior art, the present invention provides a work light stand that comprises a stand, a cross bar and a work light. The work light is installed on the cross bar via a universal direction adapter so that the user can adjust the work light itself to change the light emitting direction.

BRIEF DESCRIPTION OF THE DRAWINGS

The many merits and characteristics of the present invention may be further elaborated by the use of following figure.

DETAILED DESCRIPTION OF THE INVENTION

Figure 1:
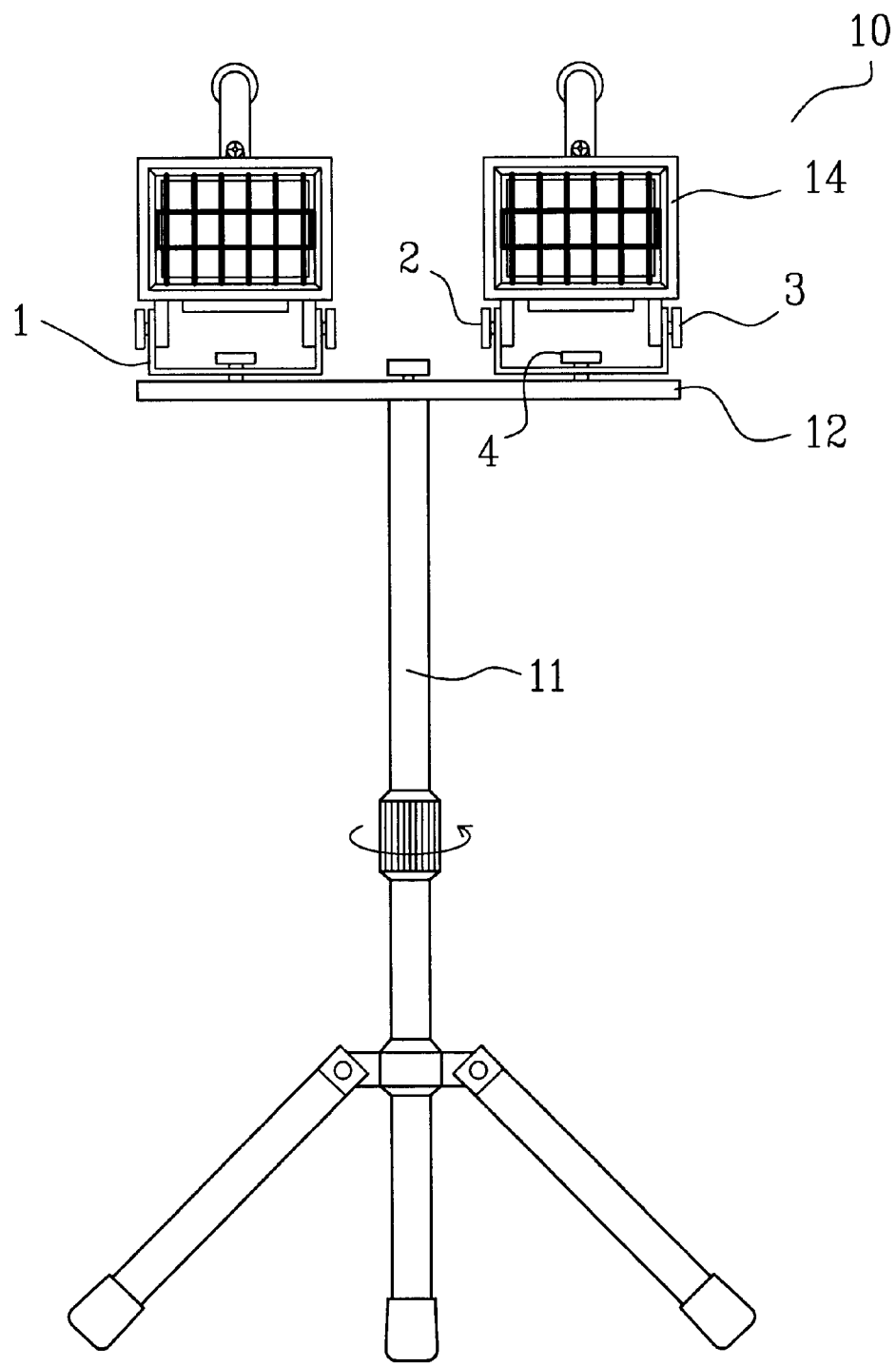
FIG. 1. A frontal view of the conventional work light stand.
Figure 2:
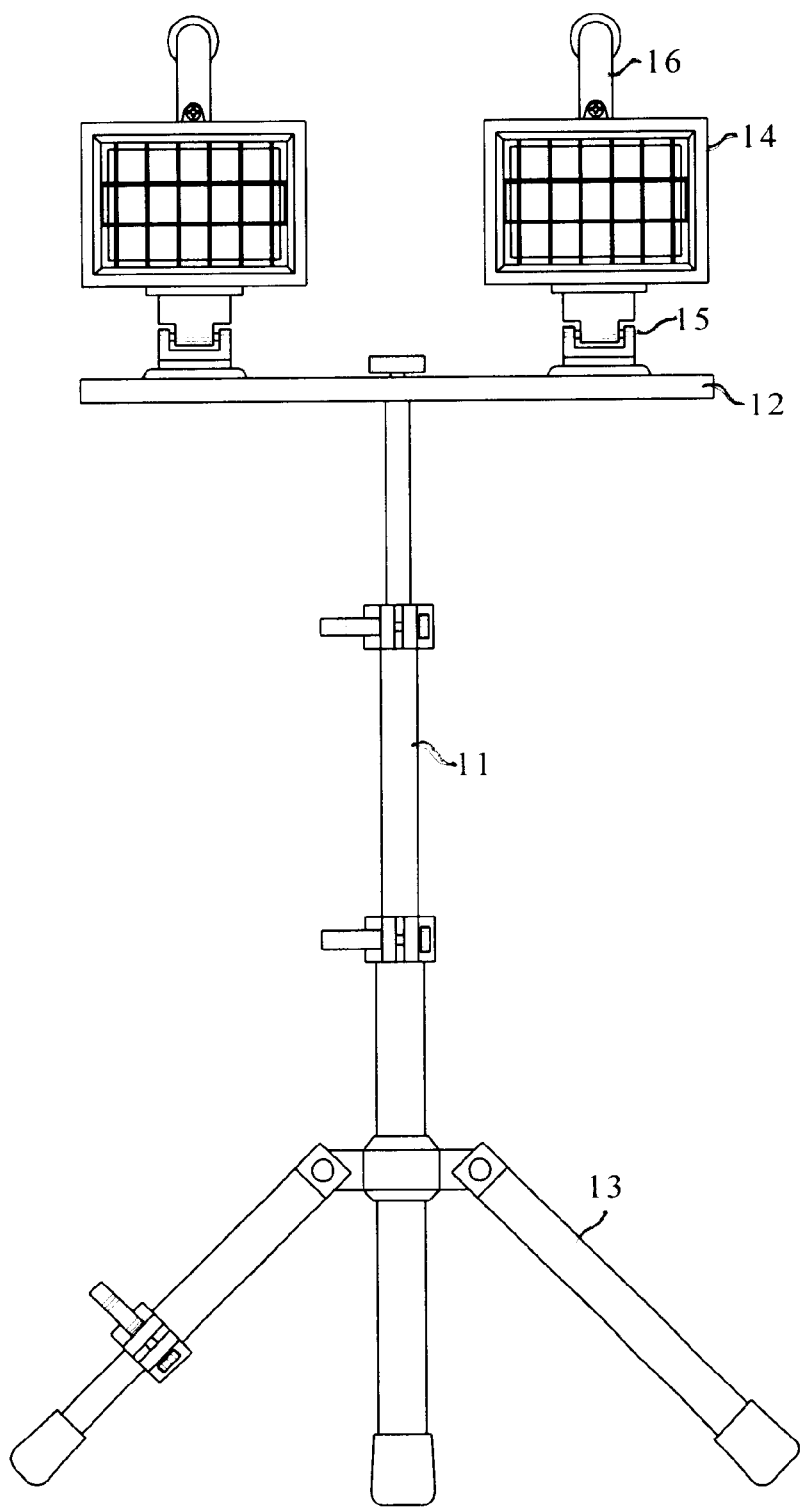
FIG. 2. A frontal view of the work light stand of the present invention.

First, as shown in FIG. 2, the work light stand of the present invention 10 comprises a stand 11 having a cross bar 12 and supporting legs 13 and at least one work light 14. The work light is installed on the cross bar 12 via a universal direction adapter 15 consisting of two hinged position fixers 151 and 152. The first position fixer 151 and the second position fixer 152 can fix each other's position in relation to any direction, so that when adjusting the light emitting direction, the user can adjust the work light 14 itself through the employment of the universal direction adapter 15, to simultaneously fine-tune both the horizontal direction and the angle of elevation. The structure of the universal direction adapter 15 is further described hereunder.

Figure 3:
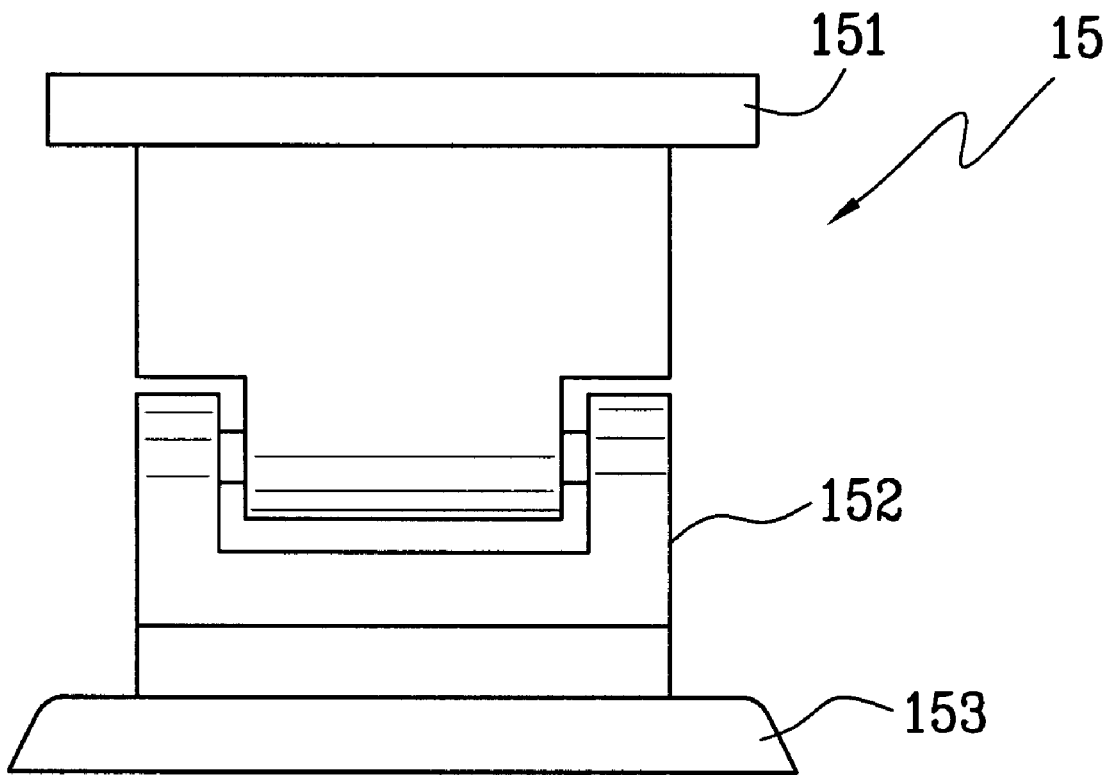
FIG. 3. A side view of the universal direction adapter of the present invention.

The universal direction adapter 15 has a wide range of applications, and generally comprises the first position fixer 151 and the second position fixer 152 as shown in FIG. 3. The first position fixer 151 is hinged to the second position fixer 152, and because of the friction force between the two fixers, any angle of elevation can be securely held. A turntable 153, underneath the second position fixer 152, enables the second position fixer 152 to be rotated in the horizontal plane. Therefore, with the universal direction adapter 15 employed in the work light stand 10 of the present invention, the work light 14 can be mounted on the first position fixer 151, and the turntable 153 of the second position fixer 152 can be mounted on the cross bar 12 of the stand 11, so that when adjusting for a new light emitting direction, regardless of its initial orientation, the work light 14 itself can be adjusted towards the desired emitting direction, and the universal direction adapter 15 between the work light 14 and the cross bar 12 will yield to the adjustment in both the horizontal direction and the angle of elevation, thus holding the work light 14 securely in the desired direction.

Moreover, a handle 16, installed on the work light 14, enables the user to hold on to it when adjusting the work light 14 and turn the universal direction adapter 15 upward or downward about its central axle, so that the adjustment in both the horizontal direction and the angle of elevation is completed in one action. After the user releases the handle 16, the friction force in the universal direction adapter 15 itself can hold the work light 14 in position of the desired emitting direction.

The above thorough description of the preferred embodiment of the present invention can be clearly grasped by a person skilled in this technical field, who can then undertake various modifications without departing from the scope and spirit of the claims hereunder. In addition, the present invention is not limited to the specific mode of embodiment described herein; for instance, the universal direction adapter 15 is not limited to any specific structure; any functionally equivalent universal direction adapter 15 can be used to connect between the work light 14 and the cross bar 12.

The work light stand of the present invention overcomes the drawback associated with the prior art in which the U-shape adjuster fixes the work light in position with screws, such that the work light cannot be adjusted in the horizontal direction and the angle of elevation simultaneously for easy operation. Therefore, the work light stand of the present invention employs the universal direction adapter for directional adjustment of the work light, where no screws are used and that allows the user easy adjustment.

What is claimed is:

1. A work light stand device comprising:

a stand;

a crossbar secured to the stand;

a universal direction adapter comprising first and second position fixers that are frictionally hinged to one another, and a turntable which is rotatably secured on a horizontal plane between the crossbar and the second position fixer;

a work light secured to the first position fixer;

the universal direction adapter supports the weight of the work light secured to the first position fixer thereof; and adjustment of the position of the work light towards any direction is made by manually rotating the position between the first and second position fixers upon which the first and the second position fixers are frictionally locked, as well as rotation of the turntable.

2. The work light stand device as claimed in claim 1, further comprising a handle secured to the work light, such that manipulation of the handle can adjust to a desired direction of the work light.

* * * * *